Sept. 23, 1958   W. M. ADEY   2,853,368
FILAMENT SUPPORT
Filed June 10, 1954   4 Sheets-Sheet 1
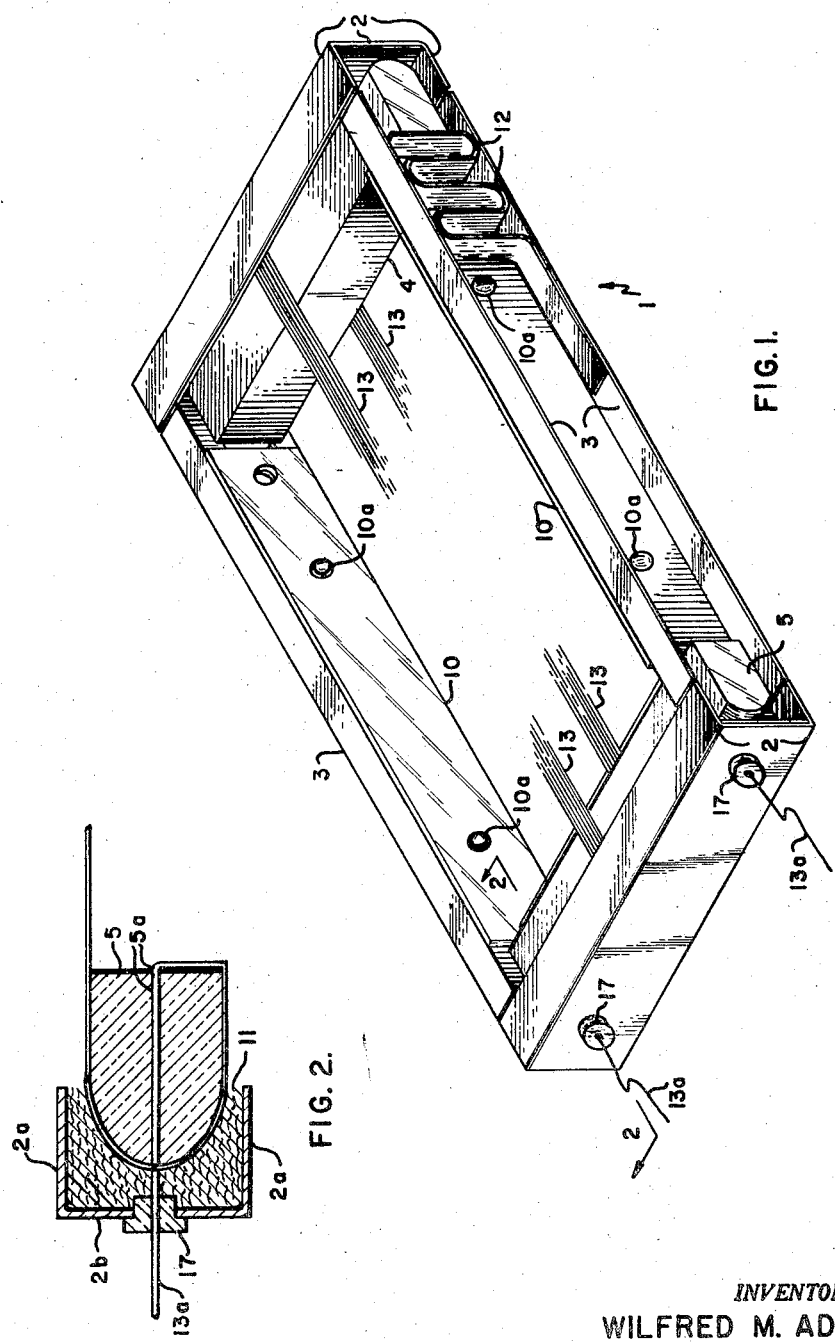
INVENTOR.
WILFRED M. ADEY
BY
ATTORNEY Sept. 23, 1958 W. M. ADEY 2,853,368
FILAMENT SUPPORT Filed June 10, 1954 4 Sheets-Sheet 2

INVENTOR.
WILFRED M. ADEY
BY
*William M. Epes*
ATTORNEY

Sept. 23, 1958 W. M. ADEY 2,853,368
FILAMENT SUPPORT
Filed June 10, 1954 4 Sheets-Sheet 3

*INVENTOR.*
WILFRED M. ADEY
BY
*William M. Epes*
ATTORNEY

Sept. 23, 1958 W. M. ADEY 2,853,368
FILAMENT SUPPORT
Filed June 10, 1954 4 Sheets-Sheet 4
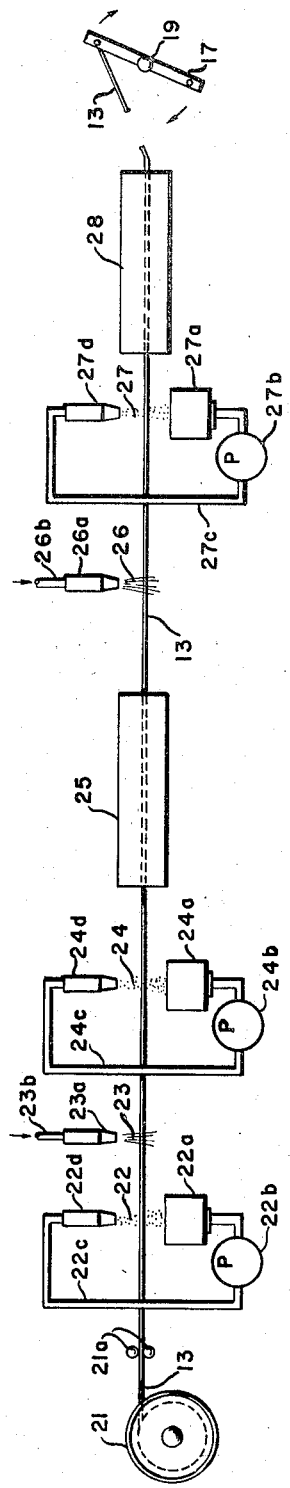
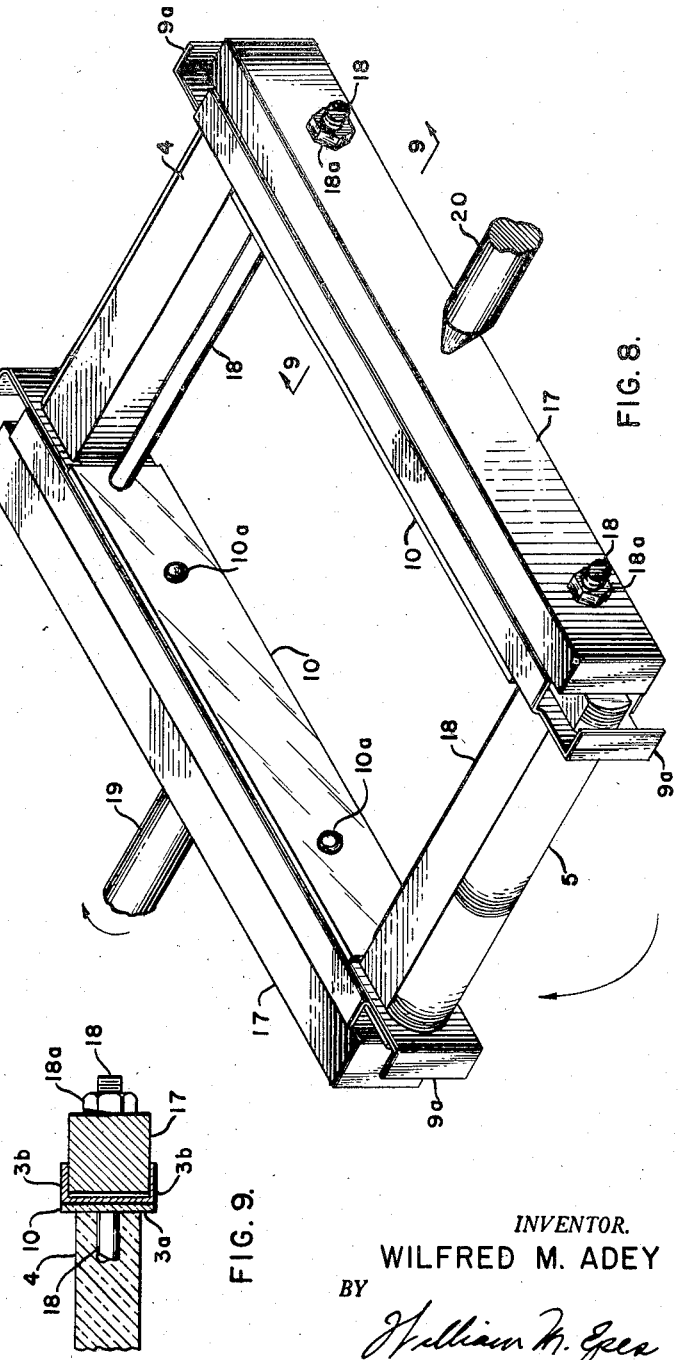
INVENTOR.
WILFRED M. ADEY
BY
ATTORNEY

United States Patent Office 2,853,368
Patented Sept. 23, 1958

2,853,368

FILAMENT SUPPORT

Wilfred M. Adey, Paoli, Pa., assignor to Oxy-Catalyst, Inc., a corporation of Pennsylvania Application June 10, 1954, Serial No. 435,846

8 Claims. (Cl. 23—288)

This invention relates to filament supports of a type particularly but not exclusively adapted to support a filament coated with or consisting of catalytic material.

The offensive odors and smoke contained in gases such as the gases which emanate from industrial and domestic ovens, incinerators, roasters, and other such devices can very often be removed by catalytic oxidation of the offending components of the gases. Where this method of gas purification is employed, it is necessary to provide a suitable catalyst in the path of the gases in order that the desired catalytic reactions will take place as the gases flow over the catalyst. The catalyst must be disposed in such manner that an intimate and complete contact between the catalyst and the gases will be effected in order to insure substantially complete elimination of the objectional components of the gases.

For many types of installations it is desirable to provide the catalyst in the form of a metallic filament or wire, preferably of relatively small cross-section, coated with or consisting of catalytic material. Such catalytic filaments of small cross-section have a relatively large surface to volume ratio, and a correspondingly large catalytic surface which, of course, is desirable since catalysis is a surface phenomenon and is dependent upon the provision of sufficient catalytic surface area. Furthermore, catalytic reactions will take place only if the activation temperature of the catalyst is attained, and a filament type catalyst of small cross-section, relatively low mass, and correspondingly low heat capacity can be heated to this activation temperature within a relatively short time.

The heat required to raise the catalyst to its activation temperature and maintain it at that temperature can be provided either (a) by the sensible heat from the gas stream and the heat of oxidation liberated upon catalytic oxidation of the combustible components of the gas stream, or (b) from an extraneous source, or (c) from both of these potential sources. Where the heat is supplied from the gas stream as in (a) the temperature of the gases must be at least equal to and preferably greater than the activation temperature of the catalyst. Under these circumstances the catalyst is placed within the stream of hot gases and, in the case of a filament type catalyst, the catalyst will be heated to the activation temperature after a relatively short time interval. Catalytic oxidation of the gases will then commence. The heat liberated by the catalytic oxidation with this arrangement is, of course, available to maintain the catalyst at its activation temperature.

Where the heat required to raise the catalyst to its activation temperature is supplied from an extraneous source as in (b), filament type catalysts offer a further advantage in that this heat can conveniently be generated by the passage of an electrical current through the filament. It is necessary to supply extraneous heat, for example, in culinary ovens which produce smoke-laden and oderiferous gases which are at a temperature below the activation temperature of practical, presently available catalysts. It is also desirable to heat the catalyst by heat from an extraneous source in some installations where the gases flow intermittently rather than continuously, since, even where such gases are at a relatively high temperature, the time interval between the commencement of gas flow and the activation of the catalyst (by heat imparted from the gas stream) would provide a period during which objectionable gases would be released. If the catalyst is heated with electrical energy by the passage of current therethrough, the catalyst will be heated to its activation temperature within a relatively short time for the reason that the heat is generated at the precise point where it is needed, i. e. at the catalyst itself. Furthermore, with this arrangement, the catalyst filament serves as its own heating means, and the necessity for additional heating means such as a burner is entirely obviated.

The provision of filament type catalysts poses several problems which do not exist in filament supports of conventional types, such as filament supports for space heating units. These problems stem in part from the fact that, as noted above, catalysis is a surface phenomenon; therefore if the offending components of fumes or gases are to be eliminated by catalytic oxidation, there must be an intimate and complete contact of the catalyst by the gases. For this reason it is desirable that the catalytic filament be of a relatively small cross-section in order to provide a large ratio of catalytic surface per unit mass of filament, and therefore a relatively large surface of catalyst. The adjacent strands of a catalytic filament must be relatively closely spaced for the reason that close spacing contributes to intimate and effective contact of the catalyst by the gases. If adjacent filament strands are spaced apart from each other a relatively large distance, as they commonly are in space heaters for example, an opportunity will be presented for a substantial portion of the gases flowing through the filament to completely avoid catalyst oxidation, and the catalytic filament will therefore fail in its intended function. Furthermore, the strands of the filament must be maintained in a taut condition when they elongate as a result of heating. Ordinarily, if filament strands are closely spaced when cold, the thermal expansion of the strands will cause sagging with resulting short-circuiting (in case of electrically heated filaments), and the development of enlarged gaps between adjacent strands such as would permit a substantial portion of the gases to escape catalytic action.

The filament support for a filament type catalyst must be constructed in such manner as to avoid any by-pass around the filament strands by the gases being purified. That is to say, the supporting framework for the filament must be such that substantially all of the raw (unpurified) gases will be forced to flow between and across the closely spaced strands and not around the strands. This requirement follows from the above discussion of the fact that successful catalytic odor elimination requires intimate and complete contact of the catalyst by the gases.

Finally, the support for the coated filament must be of such a type as will be adaptable to units of the type with which it will be used, for example stoves, ovens, incinerators and other similar appliances. The filament support for a filament type catalyst should be amenable to stacking in order to permit the use of a plurality of filaments in a series relationship relative to each other where the amount of objectionable components in the gas stream cannot be completely eliminated by a single filament type catalyst assembly.

It is one of the objects of the present invention to provide a support particularly but not exclusively adapted for filament type catalysts which will be capable of supporting a catalytic wire of relatively small diameter.

It is a further object of the present invention to provide a support which will be capable of supporting small diameter wires in closely spaced relationship to each other.

It is a further object of the present invention to provide a support for a catalytic filament which will prevent any by-pass of the gases being purified around the catalytic filament.

It is a further object of the present invention to provide a filament support in which the filament supported will be maintained in a taut condition upon heating thereof.

It is a further object of the present invention to provide a filament support for filament type catalysts which is adaptable to existing installations in which catalytic elimination of the offensive components of gases is desirable.

Further objects of the present invention will be apparent from the following description and from the annexed drawings in which:

Fig. 1 is a perspective view of a preferred embodiment of the present invention.

Fig. 2 is a view taken along the lines 2—2 of Fig. 1.

Fig. 8 is a view showing the manner in which the filament may be wound on the partially assembled filament support of the preferred embodiment of the present invention.

Fig. 9 is a view taken along the lines 9—9 of Fig. 8.

Fig. 11 is a schematic view of a continuous process for manufacturing the filament support of the instant invention.

The present invention provides a support for a filament type catalyst in which the filament is mounted on the support with adjacent strands closely spaced from each other in order to provide optimum contact between a gas stream and the catalyst. The present invention also provides resilient means for maintaining adjacent strands in a taut condition upon heating in order to minimize any tendency toward sagging by the wires with attendant short-circuiting and loss in catalyzing efficiency. Furthermore, the frame of the instant support is adaptable to incorporation into devices such as ovens, incinerators, etc., where catalytic fume purification is desirable. Finally, the catalyst-coated filament is supported within the support provided by the present invention in such manner that by-pass of gases around the filament is precluded.

Figure 4:
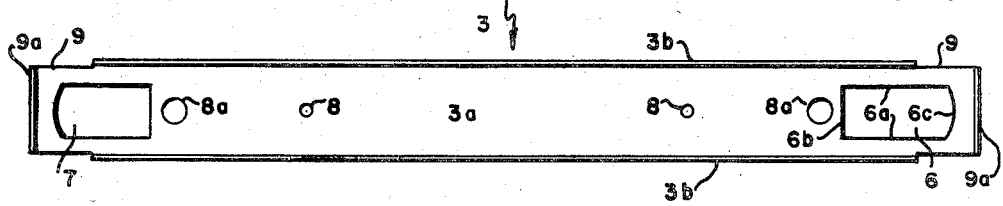
Fig. 4 is a view of one of the side members forming a part of the present invention.

As shown in Fig. 1, a preferred embodiment of the present invention comprises a filament support assembly generally indicated by the reference numeral 1 comprising end members 2, side members 3, filament support members 4, 5, spring members 12, and insulating panels 10. The end members 2 can be seen from Fig. 3 to comprise channel shaped units having sides 2a and a base 2b. As shown clearly in Figs. 3 and 4, each of the side members 3 is provided with a base portion 3a having flanges 3b extending therefrom along the central portions thereof. The side members 3 are thus channel shaped in their central portions by virtue of the flanges 3b and base portion 3a. The ends of the base portion 3a are reduced in width as at 9, and provided with a second set of flanges 9a extending normally of the plane of base portion 3a. Base portion 3a of each member 3 is provided with two slots 6 and 7 adjacent each end thereof, as shown in Fig. 4, slot 6, for reasons which will be explained below, being of a length slightly greater than slot 7. Inwardly of the slots 6, 7, openings 8 are provided which provide accommodation for fasteners 10a by which an insulating panel 10 is secured to the base 3a. A second set of openings 8a is provided in the base portion 3a of each member 3 for purposes of facilitating the assembly of the device as will be explained below.

Figures 3, 7:
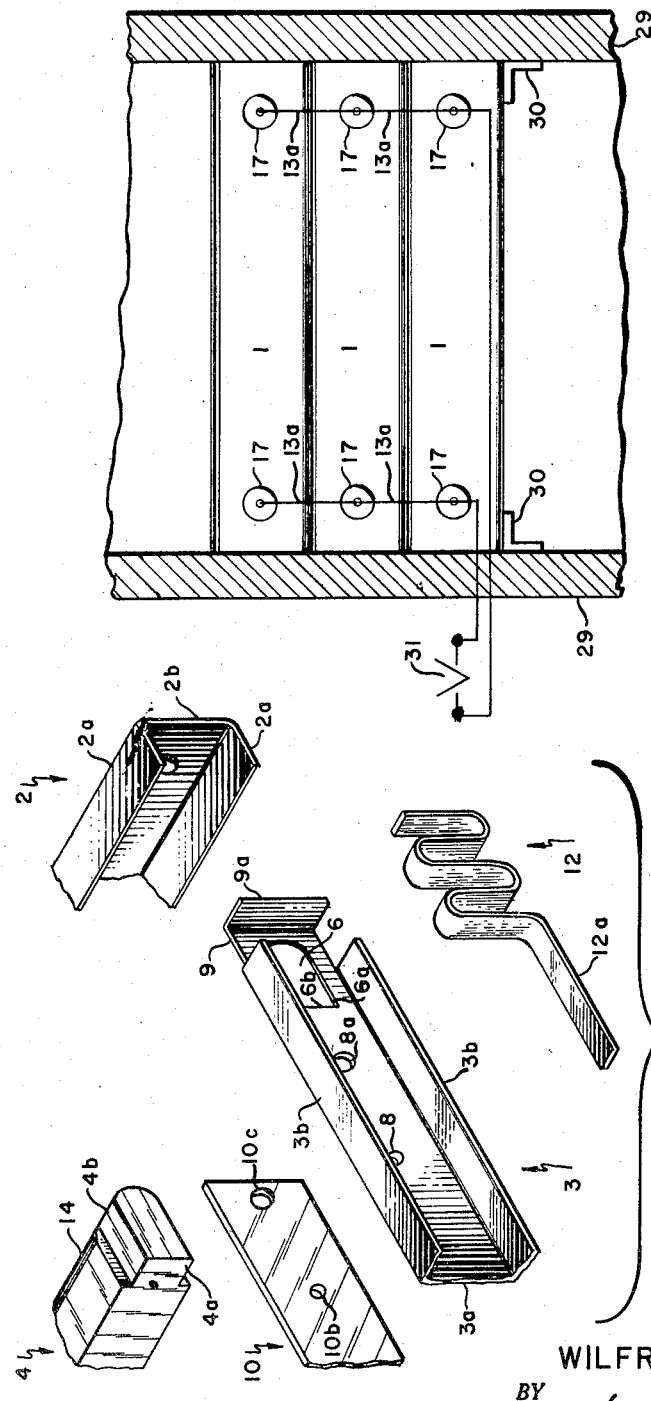
Fig. 3 is a fragmentary exploded view of a portion of the preferred embodiment of the present invention showing the manner in which the various components thereof are assembled.
Fig. 7 is a schematic view showing the manner in which a plurality of supported filaments may be stacked to provide a battery of catalytic filaments in series.

The support member 4 as more clearly shown in Fig. 3 is of a generally rectangular cross-section having one rounded surface and reduced ends 4a which provide a shoulder 4b. Both support members 4, 5, are of the same shape and size, and are retained between the side members 3 in the slots 7, 6. The slots 7 are of substantially the same size as the cross-section of the reduced portion of member 5 (with provision for thermal expansion of the side members 3). The slots 6, on the other hand, are somewhat longer than reduced portion 4a of member 4, and by virtue of this fact, permit limited movement of support member 4 toward and away from support member 5. The catalytic filament wire 13, shown in Fig. 1, is continuously and tightly coiled over the filament support members 4, 5 to provide a bi-planar filament which covers the entire space enclosed by the end members 2 and side members 3 (it being understood that in Fig. 1 this filament is only partially shown in the interest of clarity). The coiled filament thus tends to bias the movable filament support member 4 towards the left hand edge 6b (Fig. 4) of its accommodating slot 6 of side member 3 as that member is viewed in Fig. 4. The spring members 12 counteract the force of coiled filament 13 and exert a force on the ends of the support member 4 to bias this member toward the right as viewed in Fig. 1 or toward the edge 6c shown in Fig. 4. For reasons which will be explained below, the counterbalancing forces on the support member 4 by the springs 12 on the one hand and by the coiled filament 13 on the other hand are such that the support member is never in either its extreme right hand or its extreme left hand position. In other words, the reduced portions 4a of support member 4 "float" within the slots 6. These reduced portions may contact the upper and lower edges 6a of slots 6 but do not contact the right hand edge or left hand edge 6b (Fig. 4). In the embodiment shown, sinuous leaf springs are provided having four reversed bends in order to provide the requisite force on the support member 4. Obviously other types of springs such as suitably dimensioned helical springs could be substituted for the sinuous springs disclosed.

As shown in Fig. 2 the ends 13a of the wire 13 extend through openings 5a in the support member 5 and insulating sleeves 17 fitted in apertures in the base 2b of end channel 2. Obviously the ends 13a may be led through either fixed filament support 5 or movable filament support 4. If desired one end of the filament 13 may be led through fixed support 5 and the other end through movable support 4.

Figure 5:
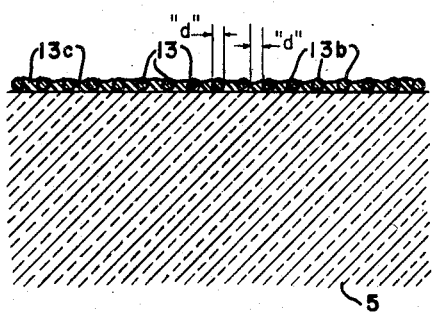
Fig. 5 is an enlarged cross-sectional view showing the relationship between the filament support member and the catalytic filament of the present invention.

Fig. 5 shows the relationship between the filament wire 13 and the filament support member 5 it being understood that the structural relationship between filament support member 4 and the filament wire 13 is the same as in Fig. 5. In this figure the wire 13 is shown as being provided with a coating 13b of catalytic material although as noted above, the invention is applicable to both coated filaments and uncoated filaments of catalytic material such as platinum. The wires 13 are wound over the support member 5 with adjacent strands being spaced apart a distance $d$ substantially equal to the wire diameter. A porcelain cement 13c such as for example the material commercially available under the name Sauereisen Acid Proof Cement No. 31 maintains the filament strands in proper spaced apart relationship.

The insulating panels 10 of mica or similar dielectric prevent the end strands of the filament 13 from contacting the side members 3. Such contacting must be prevented in order to obviate the possibility of short circuiting the current flowing in the filament 13. These panels are provided with apertures 10b and 10c (Fig. 3), the aperture 10b accommodating fastener 10a and the aperture 10c being provided for the purpose of facilitating assembly of the device as will be explained below.

In order to prevent any by-pass of the filament 13 by the gases by their being deflected upon contacting the lower layer of the filament and flowing parallel thereto into the end channels 2 and around the support members 4, 5, packing material 11 (Fig. 2) is provided between the members 4, 5 and their adjacent end channels 2. This packing material may be of any convenient fibrous material capable of preventing the flow of gases around the members 4, 5, and must have some resiliency in order to accommodate the limited movement of member 4. Fiberglas, asbestos or other similar refractory substances can conveniently be utilized for the purpose.

In the operation of the disclosed embodiment of the invention, the filament support 1 is disposed within the path of the gas stream to be purified with the plane of the filament support normal to the direction of flow of the gases. The leads 13a are suitably connected to a source of electrical power. The electrical current which flows through the filament 13 raises its temperature to the activation temperature of the catalyst and as a result, catalytic oxidation of the combustible material in the gas stream commences. As noted above, where the gas stream itself is sufficiently hot to raise the temperature of the filament 13 to the activation temperature of the catalyst, it may be unnecessary to provide extraneous heat in the form of electrical power to the filament. In either case, however, the filament 13 must be heated to a relatively elevated temperature before catalytic purification of the gas stream will commence.

When the strands of filament 13 are heated, either by electrical energy or by the heat of the gas stream, they tend to thermally elongate. To compensate for this thermal elongation of the strands, the support member 4 is moved under the influence of springs 12 away from support member 5. To accomplish this movement of support member 4, springs 12 must be under a compressive force when the filament is at room temperature. This compressive force is in part dissipated as the filament strands elongate and the support member 4 is laterally displaced by the springs 12. Upon cooling of the filament strands the reverse effect takes place; that is, the strands become shorter and the support member 4 is displaced towards support member 5 by the pulling effect of the thermally contracting strands. The strands of filament 13 are therefore at all times under some tensional stress which is induced by the pushing effect of the springs 12 upon the filament support member 4. As described above, reduced ends 4a of support 4 at all times float in the slots 6 of side members 3. In other words, this slot is of sufficient length that when the wires are cold the back of support member 4 is retained solely by the springs 12 and does not abut by the edge 6b of the slot 6. This arrangement precludes the possibility of the development of unduly high stresses in the support member 4 and the strands of filament 13 upon cooling of the filament strands.

The materials utilized in the structure of the instant invention should be chosen with reference to the temperatures which will be attained in the use thereof. The end members 2 and side members 3 can conveniently be produced from a relatively thin gage of stainless steel, which material will, of course, withstand comparatively high temperatures as would be attained by oxidizing gases. The spring member 12 should be produced from a material which will retain its resiliency at relatively elevated temperatures such as Inconel or Inconel-X. The filament support members 4, 5 can be conveniently molded from a refractory material such as ordinary porclain. The panels 10 which insulate the side members 3 from the wires of the coil 13 should be of a dielectric material capable of withstanding elevated temperatures such as mica.

As noted above, it is essential in the catalytic elimination of the offensive components of gases by means of a catalytic filament to insure substantially complete elimination, and therefore complete contact of the catalytic material by th gases. For this reason it is desirable to use a relatively small filament such as a wire having a diameter of the order of about 0.015″. The strands of the filament should be closely spaced as noted above so that no gaps or possible paths of escape of gases will be permitted. It has been found that with a wire of approximately 0.0159″ in diameter the spacing between the centers of adjacent wires should be of about the same distance. Such spacing is maintained by the use of the cement 13c which as noted above maintains the adjacent strands in fixed relationship to each other and to the support members 4, 5. The strands of the wire filament 13 should preferably be staggered as between the two planes of strands in order to maximize the intimacy and completeness of contact of the catalyst by the gas stream. The resistance wire itself should be of a material capable of withstanding a red heat, and should be amenable to coating with catalytic material. It has been found that an 80Ni 20Cr wire is desirable for installations of the instant type, although in some installations where the temperature of the wire will always be below red heat and where exceptionally long catalyst life is not a controlling factor, commercially available resistance alloys containing iron may be satisfactory.

Figure 6:
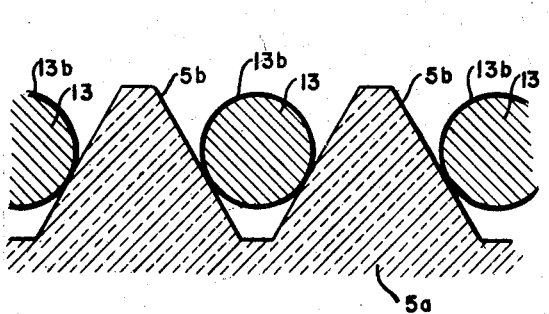
Fig. 6 is a greatly enlarged view, similar to Fig. 5, showing a modified filament support.

Fig. 6 is a view, similar to Fig. 5, showing a modified form of support member 5a. This support member is provided with threads 5b on the rounded surface thereof for the purpose of accommodating the filament wire 13 coated with catalytic material 13b. Where threads are provided as in this modification, the pitch of the threads should be equal to about twice the diameter of the coated wire 13 in order to insure a spacing between adjacent strands equal to the diameter of the wire as indicated in Fig. 6. It is unnecessary to provide a porcelain cement, such as the cement 13c of Fig. 5, where threaded filament support members are used, since the threads maintain adjacent wire strands in proper spaced relationship.

In the preferred method of manufacturing the embodiment of the invention of Fig. 1 the springs 12 are first secured to the side members 3 by welding the portion 12a of each spring to one of the flanges 3b. The spring is so located on the flange 3b that a portion of the sinuous bends lie over the slot 6. The exact location for the springs can be empirically determined for any given set of conditions in the light of the discussion set forth above as regards the floating relationship of the filament support member 4 and with due regard to the stiffness of the springs and the tension required for the strands of the filament 13.

Figure 10:
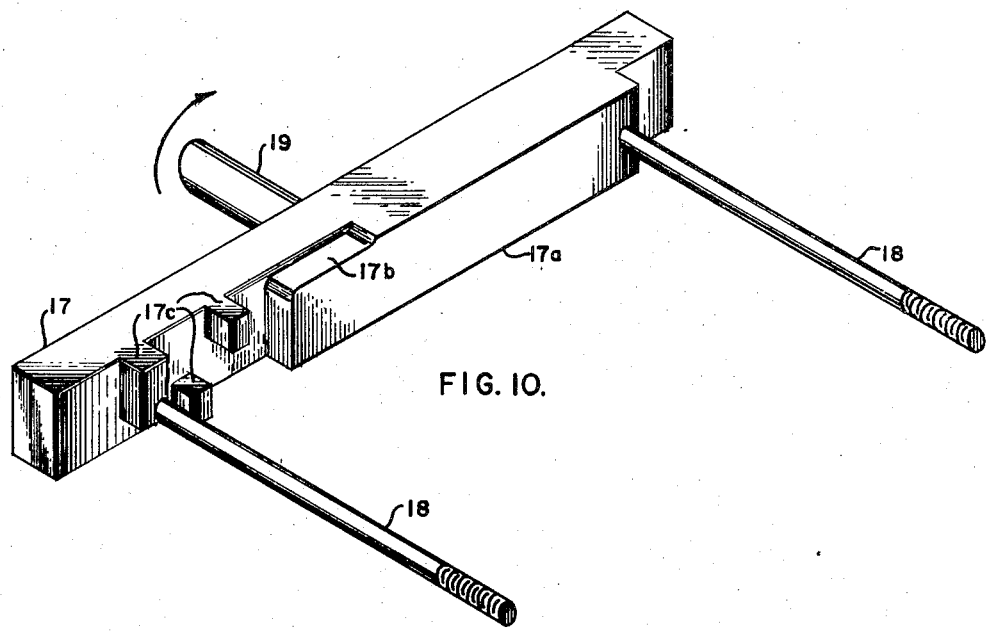
Fig. 10 is a perspective view of a component of a jig used in the manufacture of the filament support of the instant invention.

After the welding of the springs 12 to the side members, the insulating panels 10 are secured thereto by fasteners 10a which extend through the openings 8 in side members 3 and the openings 10b in panels 10. The filament support members 4, 5 are then assembled to the side members 3 and clamped in a jig shown in Figs. 8–10 to comprise clamping bars 17 and rods 18. Fig. 8 shows the side members 3 and filament support members 4, 5 clamped in the jig, while Fig. 10 shows one of the clamping bars 17 of the jig with the rods 18 and rotating shaft 19. Each of the clamping bars as shown in Fig. 10 is provided with a central projecting portion 17a having a cut-out section 17b. Adjacent the section 17b there are provided a plurality of projections 17c. As indicated in Fig. 8 the projecting portions 17a fit snugly within the flanges 3b of the side members 3. The cut-out portion 17b and the space separating the projections 17c of each bar 17 provide accommodation for the sinuous spring which, as explained above, is welded to the flanges 3a of side members 3. The projections 17c fit between the bends of the spring and permit the spring to be compressed during the winding operation. The projections are provided for the purpose of insuring sufficient bearing surface between the flanges 3b and bar 17.

The rods 18 and nuts 18a on the ends thereof maintain the bars 17 and the components 3, 4, 5 of the filament support in assembled relationship during the winding operation. The jig with the partialy assembled filament support clamped therein is rotated by a rotatable shaft 19 secured to one of the members 17 on a center 20. During this rotating step the catalytic filament is coiled over the support members 45. After this winding process is completed and while the assembly is still held in the jig, the end channels 2 are secured as by welding to the side members 3 with the flanges 9a abutting the bases 2b of the end channels. Upon completion of these steps the jig 17, 18 may be removed since the filament support is, at this stage, completely assembled.

Fig. 11 discloses a preferred continuous method of providing a catalytic coating on the wire immediately prior to the winding process. As mentioned above, the present invention is applicable to both filaments coated with a catalytic material and to filaments composed homogeneously of a catalytic material such as platinum. Where a filament coated with catalytic material is utilized the coating and winding method of Fig. 11 permits rapid and efficient production. According to this preferred method the wire 13 is unwound from a spool 21 through guides 21a. The wire 13 first passes through a continuously flowing stream of acetone 22 or other cleaning agent. The cleaning agent is recirculated by means of a recirculating system including a collecting vessel 22a, a pump 22b and a conduit 22c which conveys the liquid to a discharge nozzle 22d. Excess cleaning agent may be removed by passing the wire through a wiping device (not shown). The wire is then completely dried by evaporation of the liquid cleaning agent under the influence of an air blast 23 which issues from a nozzle 23a connected by means of a conduit 23b to a source of compressed air. The wire is next passed through a continuous stream of slurry 24 containing, for example, a catalytic metal oxide, or mixture of oxides and aluminum nitrate (this slurry being described more fully below). The slurry is, as shown in the drawing, recirculated by means of a recirculating system comprising a collector vessel 24a, a pump 24b, and a conduit 24c and nozzle 24d. This stream will deposit sufficient slurry upon the wire to form a coating of requisite thickness after heating in a furnace 25. This heating step causes evaporation of the moisture and decomposition of the aluminum nitrate to produce a hard superficial coating of catalytic metal oxide which should be no greater than about 0.015" in thickness. The wire is then drawn beneath an air blast 26 provided by a stream of air which flows through a conduit 26b and which issues from a nozzle 26a for the purpose of cooling. The wire is then drawn through a continuously circulating stream 27 of a solution of a suitable metal catalyst such as a chloroplatinic acid solution. This stream issues from a nozzle 27d and is continuously circulated by means of a collector 27a, a pump 27b and a conduit 27c. The salt which impregnates the metal oxide coating is decomposed in a second heating step, which is accomplished in a second furnace 28. Decomposition of the chloroplatinic acid leaves the oxide film suitably impregnated with metallic platinum and in condition to perform its intended catalytic function. The coated and impregnated wire upon leaving the furnace is directly wound upon the partially assembled filament support which is clamped in the jig in the manner illustrated in Fig. 8 and described above. In the process shown in Fig. 10 the wire should not be subjected to any rigorous bending after the oxide coating is applied.

Therefore the travel of the wire should be substantially straight after application of the coating and heat treatment thereof in furnace 25.

As an alternative to the method of Fig. 11 the wire may be wound upon the filament support after the manner of Fig. 8 and coated after winding and final assembly of the filament support 1.

The filament employed with the present invention can be coated with any suitable catalytic material, and it is not intended that the present invention is limited to a particular catalyst, or filaments of a particular size or cross-sectional shape. It should, however, be stated that satisfactory results can be obtained by coating the filament with a catalytic form of an inorganic oxide or a mixture of such oxides, and subsequently impregnating this coating with a suitable metal such as platinum. Such catalysts may be of the type described in the copending application of Eugene J. Houdry and W. M. Adey, Serial Number 366,057, filed July 3, 1953, now abandoned, for Catalytic Structure, namely, mixtures of alumina with beryllia or alumina with zirconia, impregnated with platinum or other metal. Coatings of this type provide films of superior hardness and adherence on smooth, nonporous surfaces such as the filament of the present invention.

Using such a film composed chiefly of catalytically active oxides, care should be taken to employ a filament composed of a material which will not detrimentally affect the catalytic activity of the oxide. In some cases, for example, iron-containing or copper-containing alloys have a tendency to poison the film of catalytic oxide, destroying its catalytic activity. Determination of the suitability of the material to receive the catalytic film can be easily determined by preparing a sample and checking its activity under operation conditions. Also with a catalytic coating of this type, the thickness of the catalytic film is of great importance, and for best results such a coating should have a thickness of no greater than about .0015".

The filament support of the present invention is provided with flat surfaces defined by the flanges 3b of side members 3 and the sides 2a of end members 2 which render it amenable to incorporation into existing devices such as stoves, incinerators, ovens, etc. with a minimum of redesigning. It is only necessary to provide guideways or the like in the appliance to accommodate the surfaces provided by the flanges 3b and sides 2a. Furthermore, a plurality of filament supports may readily and conveniently be stacked as shown in Fig. 7 to provide sufficient catalytic surface for any particular operation. In Fig. 7 the walls 29 of a flue or the like are provided with supports in the form of brackets 30. The requisite number of filament supports 1 can be stacked one on top of the other within the flue. As shown in Fig. 7, the leads 13a from each filament support 1 are suitably connected to a voltage source 31.

While I have disclosed a preferred embodiment of my invention, I contemplate that various changes might be made thereto which would be obvious to persons skilled in the art, and which would be within the scope of my invention as defined by the appended claims. For example, it might be desirable in some instances to reenforce the support members 4, 5 by means of a steel plate. The members 4, 5 under such circumstances would be provided with slots accommodating the plate which, of course, would impart stiffness to these members and increase the hot strength thereof. The particular form of the spring member, of course, can be changed if desired; for example, coil spring might be provided in place of the leaf spring 12 as shown. The diameters of the wires can, of course, be changed to suit particular conditions, and I have disclosed a diameter of 0.0159" only as being typical for catalytic filament units of relatively small size.

As noted above, the instant coil support is not limited only to use in applications in which electrical energy is utilized to supply heat for the purpose of maintaining the activation temperature of the catalyst. In some instances it may prove desirable and practical to provide a catalyst-coated wire in a hot continuously-flowing gas stream in order to effect catalytic fume elimination where the temperature of the gases is sufficient to maintain the activation temperature of the catalyst. The present invention with the disclosed mode of supporting extremely fine filaments in closely spaced relationship and the provision for maintaining the filament in a taut condition is well suited to such installations.

Other obvious modifications within the scope of the appended claims will be apparent to those skilled in the art.

I claim:

1. A catalytic unit comprising a frame, a pair of filament supporting members mounted within said frame in parallel spaced-apart relationship, a plurality of closely-spaced parallel strands of filament providing a surface of catalytic material extending between and supported at each end by said filament supporting members, one of said filament supporting members being movable in said frame toward and away from the other of said members, and resilient means mounted on said frame for resiliently urging said movable filament supporting member away from the other of said members so as to maintain the strands of filament extending between said filament supporting members in a taut condition during thermal expansion and contraction of said filament strands.

2. A catalytic unit comprising a rectangular frame having side members and end members, a pair of filament supporting members arranged within said frame at opposite ends thereof adjacent to and parallel to said end members and extending between and supported by said side members, a plurality of closely-spaced parallel strands of filament providing a surface of catalytic material extending between and supported at each end by said filament supporting members, one of said filament supporting members being movable with respect to said side members toward and away from the other of said filament supporting members, and resilient means mounted on said side members for resiliently urging said movable filament supporting member away from the other of said members so as to maintain the strands of filament extending between said filament supporting members in a taut condition during thermal expansion and contraction of said filament strands.

3. A catalytic unit comprising a rectangular frame having side members and end members, a pair of filament supporting members arranged within said frame at opposite ends thereof adjacent to and parallel to said end members and extending between and supported by said side members, a plurality of closely-spaced parallel strands of filament providing a surface of catalytic material extending between and supported at each end by said filament supporting members having end portions mounted in oppositely arranged slots provided in said side members and adapted to slide in said slots toward and away from the other of said filament supporting members, a pair of springs mounted on said side members adjacent said slots and bearing against said end portions for resiliently urging said movable filament supporting member away from the other of said members so as to maintain the strands of filament extending between said filament supporting means in a taut condition during thermal expansion and contraction of said filament strands, the length of said slots in the direction of travel of said end portions and the position of said end springs being such that said end portions travel forward and rearwardly in said slots without contacting the forward or rearward edges respectively of said slots.

4. A catalytic unit comprising a rectangular frame having side members and end members, a pair of filament supporting members arranged within said frame at opposite ends thereof adjacent to and parallel to said end members and extending between and supported by said side members, a plurality of closely-spaced parallel strands of filament providing a surface of catalytic material extending between and supported at each end by said filament supporting members, one of said filament supporting members being mounted in oppositely arranged slots provided in said side members and adapted to slide in said slots towards and away from the other of said filament supporting members, a pair of springs mounted on said side members adjacent said slots and bearing against said movable filament supporting member for resiliently urging said movable member away from the other of said members so as to maintain the strands of filament extending between said filament supporting members in a taut condition during thermal expansion and contraction of said filament strands.

5. A catalytic unit comprising a rectangular frame having side members in the form of U-shaped channels and end members connecting said side members, a pair of filament supporting members arranged within said frame at opposite ends thereof adjacent to and parallel to said end members and extending between and supported by said side members, a plurality of closely-spaced parallel strands of filament providing a surface of catalytic material extending between and supported at each end by said filament supporting members, one of said filament supporting members being mounted in oppositely arranged slots provided in said side members and adapted to slide in said slots toward and away from the other of said filament supporting members, a pair of springs mounted on said side members within the U-shaped channels formed thereby, said springs arranged adjacent said slots and bearing against said movable member for resiliently urging said member away from the other of said members so as to maintain the strands of filament extending between said filament supporting members in a taut condition during thermal expansion and contraction of said filament strands.

6. A catalytic unit comprising a rectangular frame having side members in the form of U-shaped channels arranged such that the channels thereof face in opposite directions outwardly of said frame, end members connecting said side members to one another, a pair of filament supporting members arranged within said frame at opposite ends thereof adjacent to and parallel to said end members and extending between and supported by said side members, a plurality of closely-spaced parallel strands of filament providing a surface of catalytic material extending between and supported at each end by said filament supporting members, one of said filament supporting members being mounted in oppositely arranged slots provided in said side members and adapted to slide in said slots toward and away from the other of said filament supporting members, a pair of springs mounted on said side members within the U-shaped channels formed thereby, said springs arranged adjacent said slots and bearing against said movable member for resiliently urging said member away from the other of said members so as to maintain the strands of filament extending between said filament supporting members in a taut condition during thermal expansion and contraction of said filament strands.

7. A catalytic unit comprising a rectangular frame having side members and end members, a pair of filament supporting members arranged within said frame at opposite ends thereof adjacent to and parallel to said end members and extending between and supported by said side members, a plurality of closely-spaced strands of filament providing a surface of catalytic material extending between and supported at each end by said filament supporting members, said strands of filament occupying substantially the entire area enclosed by said filament supporting members and said side members, one of said filament supporting members being movable with respect to said side members toward and away from the other of said filament supporting members and resilient means mounted on said side members for resiliently urging said movable filament supporting member away from the other of said members so as to maintain the strands of filament extending between said filament supporting members in a taut condition during thermal expansion and contraction of said filament strands, and packing material disposed between said end members and said filament supporting members to prevent the by-passing of gases therebetween.

8. A catalytic unit comprising a rectangular frame, a pair of filament supporting members mounted within said frame in parallel spaced-apart relationship, a continuous filament providing a surface of catalytic material wrapped around said filament supporting members so as to provide two layers of closely-spaced parallel strands of filament between said filament supporting members, one of said filament supporting members being movable in said frame toward and away from the other of said members, and resilient means mounted on said frame for resiliently urging said movable filament supporting member away from the other of said members so as to maintain the strands of filament extending between said filament supporting members in a taut condition during thermal expansion and contraction of said filament strands.

References Cited in the file of this patent

UNITED STATES PATENTS

| | | |
|---|---|---|
| 1,193,796 | Landis | Aug. 8, 1916 |
| 1,193,799 | Landis | Aug. 8, 1916 |
| 2,156,422 | Baader | May 2, 1939 |
| 2,658,742 | Suter | Nov. 10, 1953 |

FOREIGN PATENTS

| | | |
|---|---|---|
| 475,342 | Great Britain | Nov. 17, 1937 |